United States Patent
Ito et al.

(10) Patent No.: US 7,491,462 B2
(45) Date of Patent: Feb. 17, 2009

(54) ELECTROLYTE MEMBRANE FOR FUEL CELL OPERABLE IN MEDIUM TEMPERATURE RANGE, FUEL CELL USING THE SAME, AND MANUFACTURING METHODS THEREFOR

(75) Inventors: Naoki Ito, Yokohama (JP); Masahiko Iijima, Iruma-gun (JP); Satoshi Aoyama, Susono (JP); Satoshi Iguchi, Mishima (JP); Koichi Numata, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 390 days.

(21) Appl. No.: 10/642,282

(22) Filed: Aug. 18, 2003

(65) Prior Publication Data

US 2004/0043277 A1 Mar. 4, 2004

(30) Foreign Application Priority Data

Aug. 28, 2002 (JP) ............................. 2002-248054
Mar. 18, 2003 (JP) ............................. 2003-072994

(51) Int. Cl.
*H01M 8/10* (2006.01)
(52) U.S. Cl. ............................ 429/34; 429/30; 429/33; 429/41; 427/115; 264/104
(58) Field of Classification Search .................. 429/33, 429/34
See application file for complete search history.

(56) References Cited

U.S. PATENT DOCUMENTS

| | | | |
|---|---|---|---|
| 5,759,712 A * | 6/1998 | Hockaday | 429/30 |
| 5,795,670 A * | 8/1998 | Araki et al. | 429/40 |
| 5,846,669 A | 12/1998 | Smotkin et al. | |
| 6,521,202 B1 * | 2/2003 | Vaughey et al. | 423/599 |
| 2002/0031695 A1 * | 3/2002 | Smotkin | 429/30 |
| 2002/0098404 A1 * | 7/2002 | Shibata et al. | 429/40 |
| 2002/0155335 A1 * | 10/2002 | Kearl | 429/30 |
| 2003/0044667 A1 * | 3/2003 | Hara et al. | 429/30 |
| 2003/0235753 A1 * | 12/2003 | Champion | 429/44 |
| 2006/0003212 A1 | 1/2006 | Kim et al. | |

FOREIGN PATENT DOCUMENTS

| | | |
|---|---|---|
| DE | 198 15 209 A1 | 10/1999 |
| DE | 19914571 C2 | 1/2001 |
| EP | 1 166 860 A2 | 6/2001 |

(Continued)

*Primary Examiner*—Jonathan Crepeau
*Assistant Examiner*—Tony Chuo
(74) *Attorney, Agent, or Firm*—Oliff & Berridge, PLC

(57) ABSTRACT

The invention provides an electrolyte membrane that allows an operating temperature of a solid polymer membrane fuel cell to be raised and an operating temperature of a solid oxide fuel cell to be lowered. This electrolyte membrane can be used in a fuel cell that is operable in an intermediate temperature range. The invention also provides a fuel cell using such an electrolyte membrane. The electrolyte membrane has a hydrated electrolyte layer, and dense layers made of a hydrogen permeable material that are formed on both sides of this electrolyte layer. Both sides of the electrolyte membrane are coated with dense layers. Consequently, evaporation of moisture contained in the electrolyte layer is suppressed, and increase in the resistance of the membrane is inhibited. As a result, the range of the operating temperature of the fuel cell can be enlarged.

14 Claims, 13 Drawing Sheets

FOREIGN PATENT DOCUMENTS

| | | | |
|---|---|---|---|
| GB | 1 100 102 A | 1/1968 | |
| JP | A-4-345762 | 12/1992 | |
| JP | A 5-299105 | 11/1993 | |
| JP | 07-185277 | * | 7/1995 |
| JP | A 7-185277 | 7/1995 | |
| WO | WO 97/01194 A | 1/1997 | |
| WO | WO 98/21777 A | 5/1998 | |
| WO | WO 98/13062 A | 7/1998 | |
| WO | WO 98/31062 | * | 7/1998 |
| WO | WO 99/39398 A | 8/1999 | |
| WO | WO 99/52159 | 10/1999 | |
| WO | WO 00/39876 A | 7/2000 | |
| WO | WO 02/11226 A2 | 2/2002 | |
| WO | WO 2007/049130 A | 5/2007 | |

* cited by examiner

FIG.8

| CASE | L1 SUBSTRATE | L2 ELECTROLYTE LAYER | L3 SUBSTRATE | L4 ELECTROLYTE LAYER | L5 SUBSTRATE |
|---|---|---|---|---|---|
| A | Pd | O | V | O | Pd |
| B | V / Pd | O | Pd | – | – |
| C | V / Pd | O | – | – | – |
| D | – | O | Pd | – | – |

O₂-ELECTRODE (bottom) / H₂-ELECTRODE (top)

FIG. 12
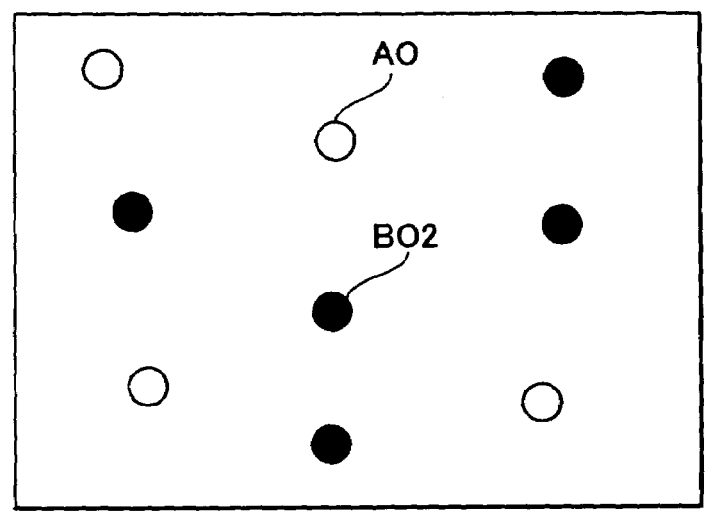
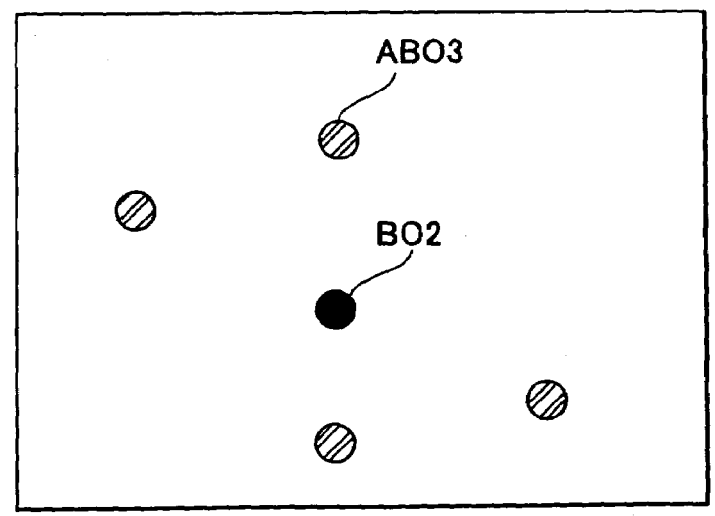

FIG. 13
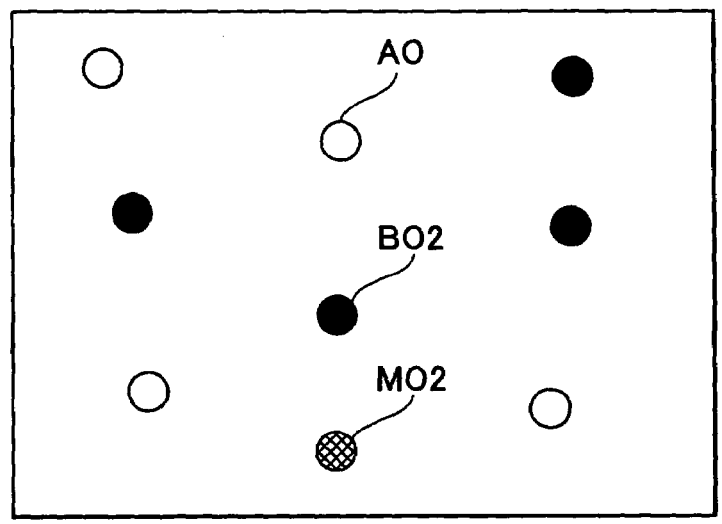
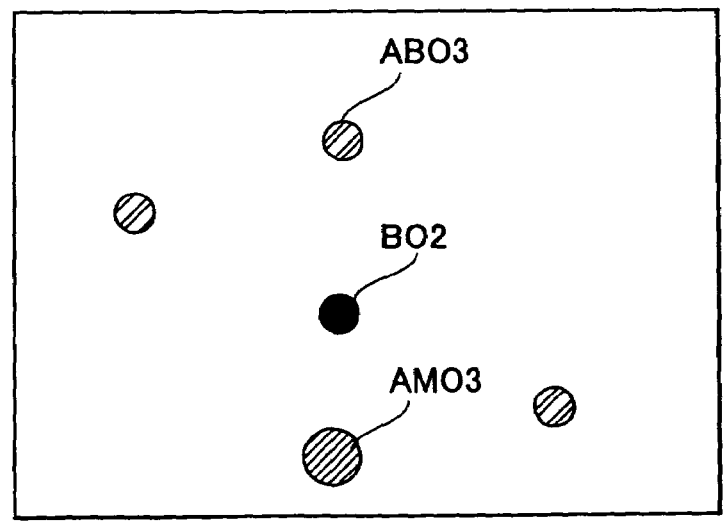

ELECTROLYTE MEMBRANE FOR FUEL CELL OPERABLE IN MEDIUM TEMPERATURE RANGE, FUEL CELL USING THE SAME, AND MANUFACTURING METHODS THEREFOR

INCORPORATION BY REFERENCE

The disclosure of Japanese Patent Application No. 2002-248054 filed on Aug. 28, 2002 and No. 2003-072994 filed on Mar. 18, 2003, including the specification, drawings and abstract is incorporated herein by reference in its entirety.

BACKGROUND OF THE INVENTION

1. Field of the Invention

The invention relates to a solid electrolyte membrane for a fuel cell that is operable in a medium temperature range, a fuel cell using this solid electrolyte membrane, and manufacturing methods therefor.

2. Description of Related Art

In recent years, fuel cells for generating electric power by an electrochemical reaction between hydrogen and oxygen have attracted attention as an energy source. Amongst fuel cells, fuel cells using solid electrolyte membranes include low temperature fuel cells, such as solid polymer membrane fuel cells, and high temperature fuel cells such as solid oxide fuel cells.

The solid polymer membrane fuel cell uses a polymer membrane, for example, Nafion (a registered trademark of E. I. du Pont de Nemours and Company) as an electrolyte membrane sandwiched between electrodes. When the moisture content of such an electrolyte membrane decreases, the ion conductivity thereof decreases, whereas the resistance thereof increases. Therefore, it is necessary to operate the fuel cell at a low temperature at which extreme evaporation of moisture content can be avoided, in order to limit the resistance of the membrane to within a practical range. Under the present circumstances, the solid polymer membrane fuel cell is ordinarily operated in a temperature range having an upper limit of around 150° C.

The solid oxide fuel cell uses a thin membrane made of an inorganic material, for instance, zirconia, as an electrolyte membrane sandwiched between electrodes. However, there is a tendency for the resistance of such an electrolyte membrane to increase, as the temperature lowers. Thus, it is necessary to operate the fuel cell at a relatively high temperature in order to limit the resistance of such a membrane to within a practical range. Although the resistance of the membrane can be reduced by decreasing the thickness of the electrolyte membrane, it is very difficult to form a dense thin membrane on an electrode formed from a porous material. Therefore, it has not been possible to provide a sufficiently thin electrolyte membrane. Under the present circumstances, the solid oxide fuel cell is ordinarily operated at a temperature that is higher than or equal to about 700° C.

Moreover, in the related art, a hydrogen separation membrane having a five-layer structure, in which both sides of a base metal selected from group VB elements (for example, vanadium (V), niobium (Nb), and tantalum (Ta)) is coated using palladium (Pd) with hydrogen permeable intermediate layers interposed on both sides of the base metal, has been proposed as an example of constituting the membrane from a plurality of layers.

None of the fuel cells using solid electrolyte membranes that are disclosed in such related art operate in a medium temperature range of about 150° C. to about 700° C. Generally, there is a tendency that the higher the temperature, the lower the resistance of the electrolyte membrane. Thus, in the case of the solid polymer membrane fuel cell a high operating temperature is desirable. On the other hand, when the operating temperature of a fuel cell is extremely high, a system using such a fuel cell needs to employ structural members and a configuration that takes into consideration heat resistance. In turn, this leads to constraints on design.

SUMMARY OF THE INVENTION

According to a first aspect of the invention, an electrolyte membrane is provided for a fuel cell that is operable in a medium temperature range. This electrolyte membrane has a three-layer structure including a hydrated electrolyte layer containing moisture and dense layers which are made of a hydrogen permeable material and which are formed on both sides of the electrolyte layer. Both sides of the hydrated electrolyte layer are covered by the dense layers. Thus, even when the fuel cell is operated at high temperature, evaporation of moisture contained in the hydrated electrolyte layer can be inhibited. Moreover, increase in the resistance of the electrolyte membrane can be suppressed. Consequently, the range of the operating temperature of the low temperature fuel cell can be enlarged by using such an electrolyte membrane.

According to a second aspect of the invention, a fuel cell is provided that uses the electrolyte membrane according to the first aspect of the invention. This fuel cell is configured to include an oxygen electrode disposed on one side of the electrolyte membrane, an oxidizing gas supply portion that supplies an oxidizing gas to the oxygen electrode, a hydrogen electrode disposed on the other side of the electrolyte membrane, and a fuel gas supply portion that supplies a hydrogen-rich fuel gas to the hydrogen electrode.

According to a third aspect of the invention, an electrolyte membrane is provided that includes a substrate formed from a dense hydrogen permeable material and an inorganic electrolyte layer formed on at least one side of the substrate. By forming the electrolyte membrane on the dense substrate, the electrolyte layer can be formed so as to be sufficiently thin. For example, although the thickness of a conventional electrolyte layer is larger than or equal to 10 μm, the thickness of the electrolyte layer according to the invention can be reduced to around 0.1 μm to 1 μm. Consequently, the operating temperature of the high temperature fuel cell can be reduced to a low temperature by using the electrolyte membrane according to the invention.

According to a fourth aspect of the invention, a fuel cell is provided using the electrolyte membrane according to the third aspect of the invention. This fuel cell is configured with an oxygen electrode disposed on one side of the electrolyte membrane; an oxidizing gas supply portion is provided for supplying oxidizing gas to the oxygen electrode. Furthermore, a hydrogen electrode is disposed on the other side of the electrolyte membrane, and a fuel gas supply portion is provided for supplying a hydrogen-rich fuel gas to the hydrogen electrode.

According to a fifth aspect of the invention, methods of manufacturing an electrolyte membrane are provided. The invention provides a first method of manufacturing an electrolyte membrane, which includes the steps of forming a hydrated electrolyte layer that contains moisture, and forming dense layers made of a hydrogen permeable material on both sides of the electrolyte layer. The fifth aspect also provides a second method of manufacturing an electrolyte membrane, which includes the steps of preparing a substrate formed from a dense hydrogen permeable material, and forming an inorganic electrolyte layer on at least one side of the substrate.

According to a sixth aspect of the invention, a method of manufacturing a fuel cell is provided. This manufacturing method includes the steps of providing an oxygen electrode, a hydrogen electrode, an oxidizing gas supply portion, and a fuel gas supply portion on the electrolyte membrane obtained by the manufacturing method according to the fifth aspect of the invention.

BRIEF DESCRIPTION OF THE DRAWINGS

The aforementioned embodiments and other embodiments, objects, features, advantages, technical and industrial significance of the invention will be better understood by reading the following detailed description of exemplary embodiments of the invention, when considered in connection with the accompanying drawings, in which:

FIG. 8 is an explanatory view illustrating a layer configuration table of the solid oxide fuel cell according to the second embodiment of the invention and modifications thereof;

FIG. 12 is an explanatory view illustrating a first way of generation of electrolytes according to the second embodiment of the invention; and FIG. 13 is an explanatory view illustrating a second way of generation of electrolytes according to the second embodiment of the invention.

DETAILED DESCRIPTION OF THE PREFERRED EMBODIMENTS

In the following description and the accompanying drawings, the invention will be described in more detail in terms of exemplary embodiments.

A first embodiment of the invention is described herein below.

Figure 1:
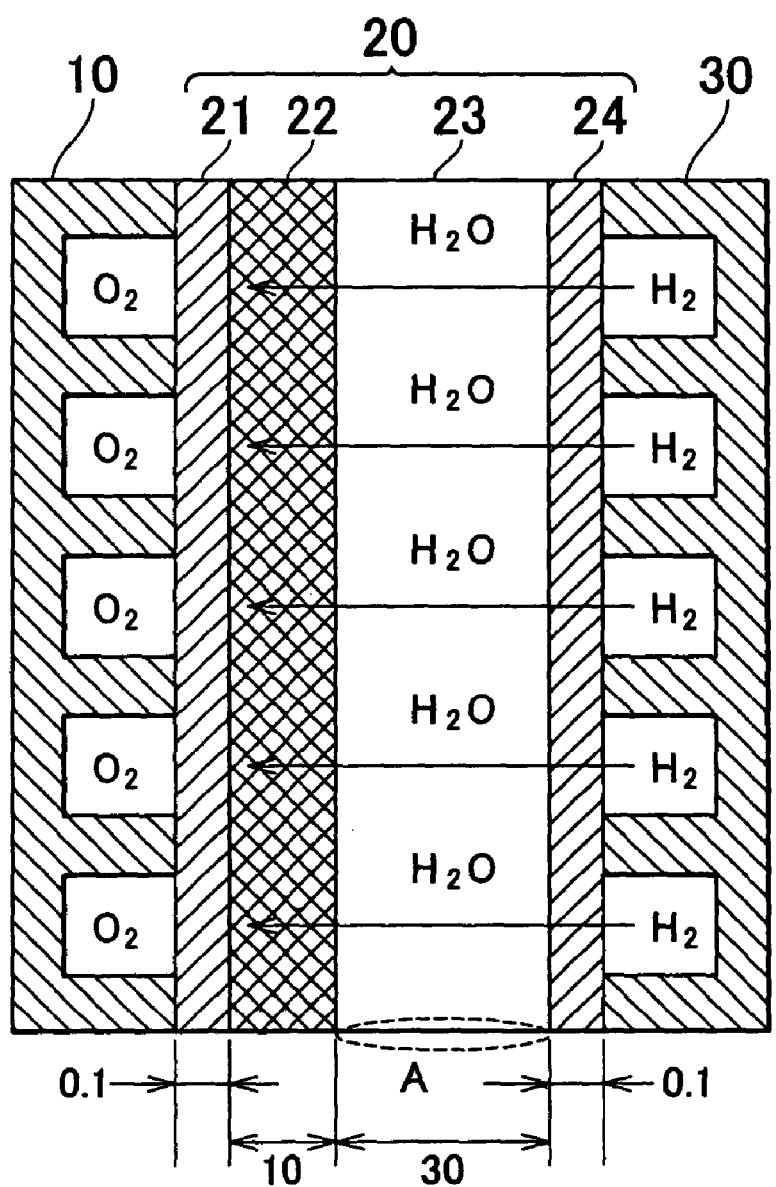
FIG. 1 is an explanatory view schematically illustrating the configuration of a solid polymer membrane fuel cell according to an embodiment of the invention.

FIG. 1 is an explanatory view schematically illustrating the configuration of a solid polymer membrane fuel cell according to the first embodiment of the invention. The figure shows a cross-section of a constituent cell of the fuel cell. This constitute cell has a structure in which an electrolyte membrane 20 is sandwiched between an oxygen electrode 10 and a hydrogen electrode 30. The oxygen electrode 10 is provided with a flow path for supplying air serving as an oxidizing gas. The hydrogen electrode 30 is provided with a flow path for supplying a hydrogen-rich fuel gas. The oxygen electrode 10 and the hydrogen electrode 30 may be formed from various materials such as carbon.

The electrolyte membrane 20 has a multi-layer structure in which an electrolyte layer 23 formed from a solid polymer membrane is sandwiched between hydrogen permeable dense metallic layers. As the electrolyte layer 23, for example, a Nafion membrane ("Nafion" is the registered trademark of E. I. du Pont de Nemours and Company) may be used. A dense layer 24 of palladium (Pd) is provided on the hydrogen-electrode-side surface of the electrolyte layer 23. A dense layer 22 made of a vanadium-nickel alloy (V—Ni) is provided on the oxygen-electrode-side surface of the electrolyte layer 23. A dense layer 21 of palladium (Pd) is also provided on the oxygen-electrode-side surface of the dense layer 22. In this first embodiment, the thickness of each of the Pd dense layers 21 and 24 is set to be 0.1 μm. The thickness of the vanadium-nickel alloy (V—Ni) dense layer 22 is set to be 10 μm. The thickness of the electrolyte layer 23 is set to be 30 μm. However, it should be noted that the thickness of each of the layers can be set as chosen.

The electrolyte layer 23 contains moisture. As described above, the electrolyte layer 23 is sandwiched between the dense layers 22 and 24. Therefore, there is only a limited possibility that moisture contained in the electrolyte layer 23 will pass through the dense layers 22 and 24 to the electrodes, and then pass out of the constituent cell. Further, discharge of the moisture from the periphery of the electrolyte layer 23 can be suppressed by sealing the periphery (for instance, the region A shown in FIG. 1) thereof. Accordingly, the dense layers 22 and 24 and a seal (not shown) of the periphery of the electrolyte layer 23 of the first embodiment function as a moisture retention mechanism for retaining the moisture contained in the electrolyte layer 23.

In an electric power generation process, hydrogen included in a fuel gas supplied to the hydrogen electrode 30 is split into protons and electrons. The protons move through the electrolyte layer 23 and combine with oxygen and electrons at the oxygen electrode 10 to produce water. The moisture contained in the electrolyte layer 23 assists the movement of the protons. Usually, catalyst layers of platinum (Pt), or the like, are provided in the constituent cell to accelerate reactions at the hydrogen electrode and at the oxygen electrode. Although not shown in FIG. 1, the catalyst layers may be provided, for example, between the oxygen electrode 10 and the dense layer 21 and between the hydrogen electrode 30 and the dense layer 24. Alternatively, the catalyst layer may be provided, for example, between the dense layers 21 and 22, between the dense layer 22 and the electrolyte layer 23, and between the electrolyte layer 23 and the dense layer 24.

Figure 2:
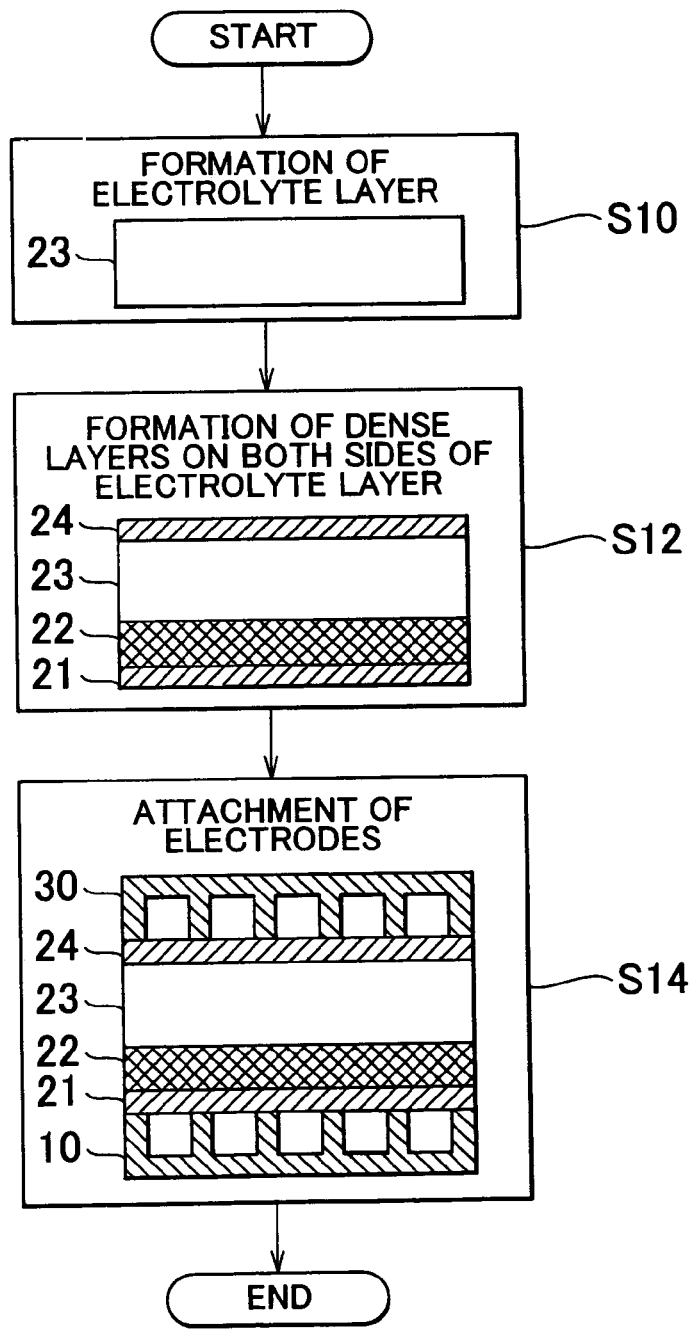
FIG. 2 is a process chart illustrating a process for manufacturing the fuel cell according to the embodiment of the invention.

FIG. 2 is a process chart illustrating a process of manufacturing the fuel cell according to the first embodiment of the invention. In this manufacturing process, first, the electrolyte layer 23 is produced in step S10. Subsequently, the dense layers 21, 22, and 24 are formed on both sides of this electrolyte layer 23 in step S12. Then, each of the electrodes 10 and 30 is attached to a respective outer surface of the dense layers 21 and 24 in step S14. Using this process, each of the catalyst layers can be properly formed in accordance with its position in the respective process step.

According to the aforementioned fuel cell, the moisture of the electrolyte layer 23 can be retained within the electrolyte layer 23. Thus, operation of the fuel cell at a relatively high temperature is enabled. For instance, in the case of using a Nafion membrane as the electrolyte layer 23, the fuel cell can be operated at about 200° C.

Figure 3:
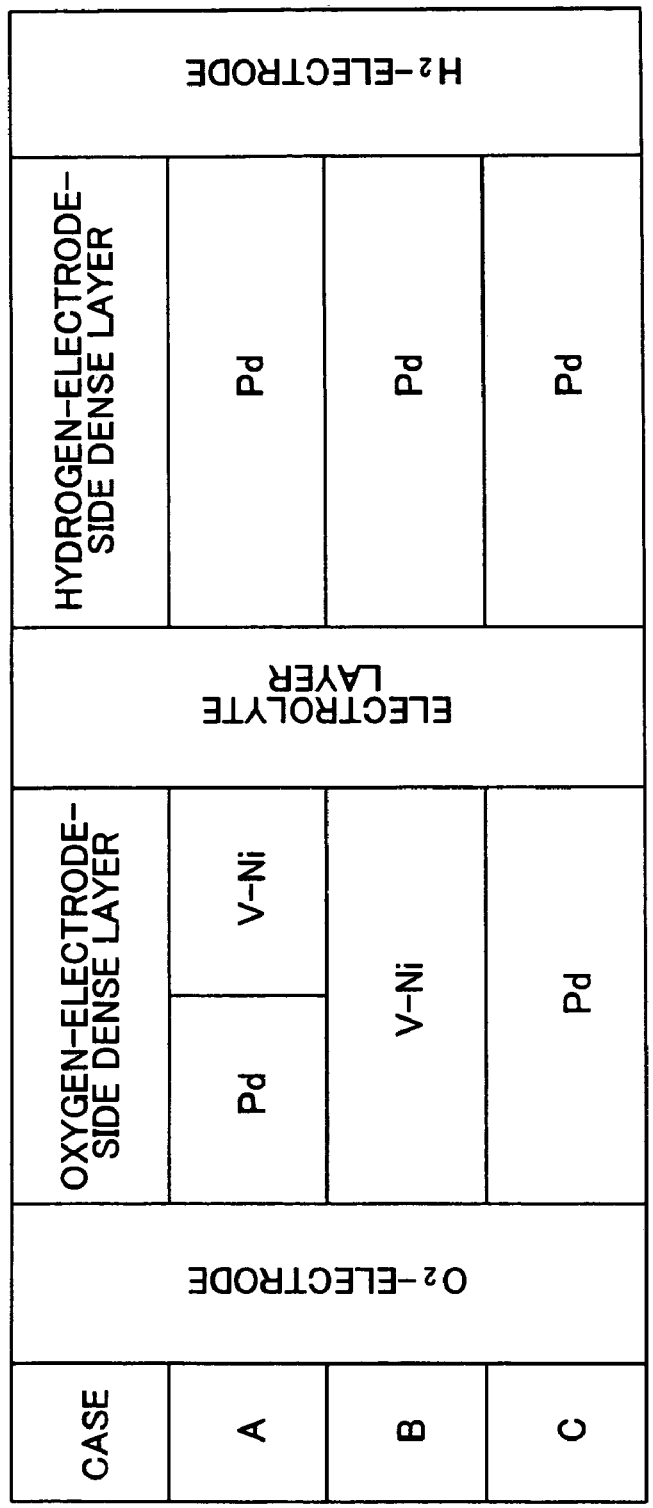
FIG. 3 is an explanatory view illustrating a layer configuration table of respective constituent cells of a solid polymer membrane fuel cell according to the first embodiment and modifications thereof.

FIG. 3 is an explanatory view illustrating a layer configuration table of respective constituent cells of the solid polymer membrane fuel cell according to the first embodiment and modifications thereof. Case A corresponds to the structure of the first embodiment illustrated in FIG. 1. That is, this constituent cell has a structure in which the oxygen-electrode-side dense layer consisting of a layer of vanadium-nickel alloy (V—Ni) and a layer of palladium (Pd) is provided between the electrolyte layer and the oxygen electrode, and in which the hydrogen-electrode-side dense layer of palladium (Pd) is provided between the electrolyte layer and the hydrogen electrode.

It is sufficient that the fuel cell of the first embodiment has the dense layers provided on respective sides of the electrolyte layer. Therefore, for example, the constituent cell may have a structure provided with an oxygen-electrode-side dense layer of a vanadium-nickel alloy (V—Ni) and a hydrogen-electrode-side dense layer of palladium (Pd) as in Case B. Alternatively, both the oxygen-electrode-side dense layer and the hydrogen-electrode-side dense layer may be formed from palladium (Pd). In both Cases A and B, vanadium (V) or other alloys containing vanadium may be used as the material of the oxygen-electrode-side dense layer, instead of the vanadium-nickel alloy (V—Ni). In addition to the aforementioned materials, niobium, tantalum, and other alloys that respectively contain at least a part of these elements can be used as the material of the oxygen-electrode-side dense layer. Generally, these materials have high hydrogen permeability and are relatively low in price, and are thus suitable for this application. The reason for using materials, such as vanadium (V), in the oxygen-electrode side dense layer is that these materials have a tendency to suffer from hydrogen embrittlement. However, this does not means that these materials cannot be used as the material for the hydrogen-electrode-side dense layer. Further, a palladium alloy can be used as the material of the hydrogen-electrode-side dense layer, instead of palladium (Pd). Palladium (Pd) has relatively high hydrogen permeability and is resistant to hydrogen brittleness. It should be noted that the modifications shown in FIG. 3 are only illustrative. Dense layers made of various materials can be applied to the solid polymer membrane fuel cell according to the invention.

Further, a sandwich structure membrane composed of a layer of palladium (Pd)/a layer of vanadium (V)/and a layer of palladium (Pd) may be used as the hydrogen permeable material of the dense layer. Vanadium (V) has advantages in that it has a higher rate of permeation of protons and hydrogen atoms than palladium (Pd), and is also lower in price. However, vanadium (V) has the disadvantage that it has a limited ability to separate hydrogen molecules into protons, etc. Thus, the permeability of the membrane is enhanced by forming a thin layer of palladium (Pd), which has a high ability to separate hydrogen molecules into protons and electrons, on one or both of sides of the layer of vanadium (V).

In the fuel cell according to the first embodiment, the electrolyte layer 23 is not limited to being a solid polymer membrane. Membranes that include moisture within a ceramic, glass, or alumina-based material, for example, a heteropoly acid-based or β-alumina-based material, may be used as the electrolyte layer 23. When such materials are used, the fuel cell can be operated at about 300° C.

Figure 4:
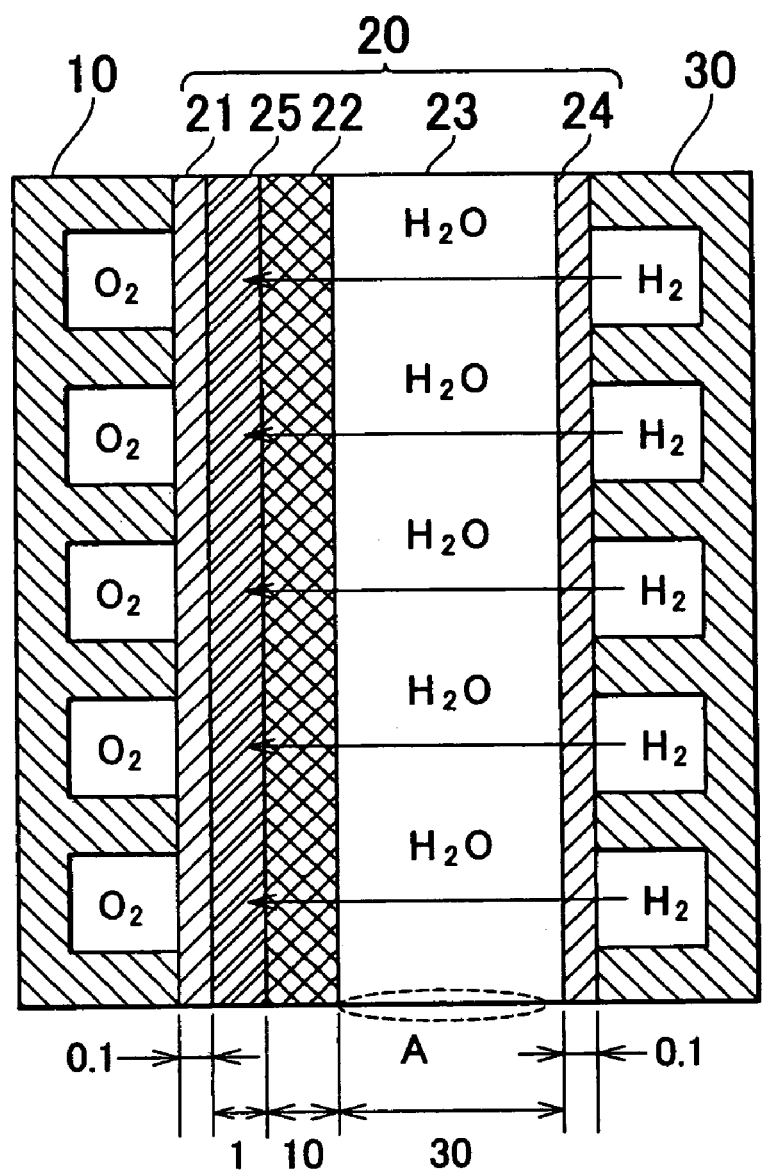
FIG. 4 is an explanatory view schematically illustrating a first configuration of a solid polymer membrane fuel cell having a metal diffusion suppression layer according to the first embodiment.

FIG. 4 is an explanatory view schematically illustrating a first configuration of the solid polymer membrane fuel cell having a metal diffusion suppression layer. The figure shows a cross-section of a constituent cell of the fuel cell. The basic constituent elements thereof are similar to those of the fuel cell shown in FIG. 1. However, the cell shown in FIG. 4 differs from that shown in FIG. 1 in that a metal diffusion suppression layer 25 is formed along the respective boundary surfaces of the dense layer 21 of palladium (Pd) and the dense layer 22 of the vanadium-nickel alloy (V—Ni). As shown in FIGS. 1 to 3, the hydrogen permeability of the hydrogen permeable material lowers with time or during heat treatment executed during manufacturing owing to mutual diffusion of the different kinds of metal. When such an electrolyte membrane is used in a fuel cell, the electromotive force of the fuel cell decreases. However, by providing the metal diffusion suppression layer 25 it is possible to inhibit the mutual diffusion of the different kinds of metal, and suppress the reduction in the hydrogen permeability of the hydrogen permeable material.

In this embodiment, the metal diffusion suppression layer 25 is a dense element that has a thickness which is set to 1 μm. However, the thickness of the metal diffusion suppression layer 25 can be set as chosen. Further, although tungsten oxide ($WO_3$) is used as the material of the metal diffusion suppression layer 25 in the first embodiment, the material of the metal diffusion suppression layer 25 is not limited thereto. A proton conductor, a mixed conductor, a ceramic, composites of these materials, and a gradient material may be used as the material of the metal diffusion suppression layer 25. For example, the proton conductors may be composite oxides, such as perovskite oxides and pyrochlore oxides, and spinel oxides, and the mixed conductor may be, for instance, $MnO_3$.

Figure 5:
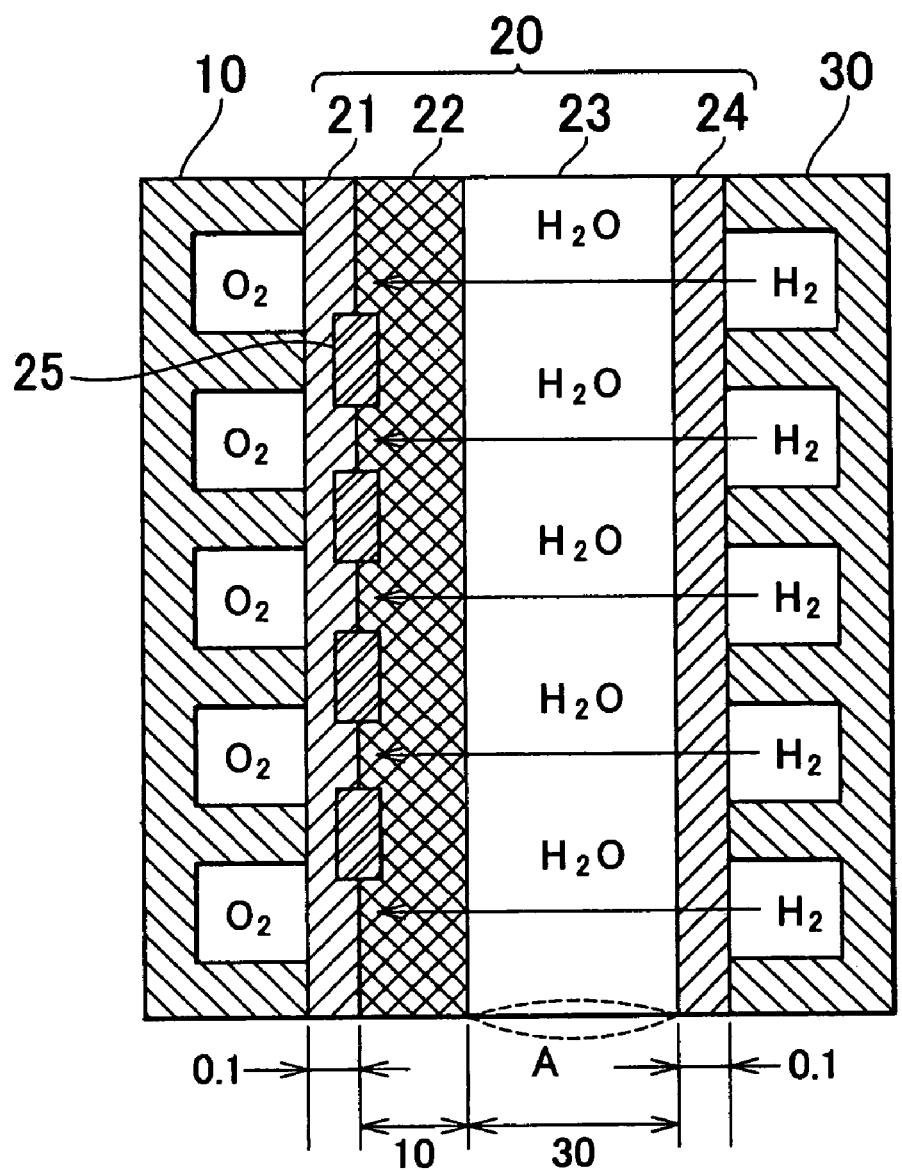
FIG. 5 is an explanatory view schematically illustrating a second configuration of the solid polymer membrane fuel cell having a metal diffusion suppression layer according to the first embodiment.

FIG. 5 is an explanatory view schematically illustrating a second configuration of the solid polymer membrane fuel cell having the metal diffusion suppression layer. The figure shows a cross-section of a constituent cell of the fuel cell. The basic constituent elements thereof are similar to those of the fuel cell shown in FIG. 1. However, the cell shown in FIG. 5 differs from that shown in FIG. 1 in that the metal diffusion suppression layer 25 is discontinuously formed in an island-like arrangement along the boundary surface between the dense layer 21 of palladium (Pd) and the dense layer 22 of the vanadium-nickel alloy (V—Ni).

Although the thickness of the metal diffusion suppression layer 25 is set in this embodiment to be 1 μm, the thickness of the layer 25 can be set as chosen. Further, although nickel (Ni), which is a proton-nonconductive metal, is used as the material for the metal diffusion suppression layer 25, the material of the layer 25 is not limited thereto. A proton conductor, a mixed conductor, an insulating material, a proton-nonconductive metal, ceramics, composites of these materials, and a gradient material may be used as the material of the metal diffusion suppression layer 25. Examples of the proton conductor are composite oxides, such as perovskite oxides and pyrochlore oxides, and spinel oxides. An example of the mixed conductor is $MnO_3$. Examples of the insulating material are $Al_2O_3$, $SiO_2$, and MgO. An example of the proton-nonconductive metal is Co. It should be noted that, particularly in the case of employing an insulating material for the metal diffusion suppression layer 25, it is effective to discontinuously provide the metal diffusion suppression layer 25 in the island-like arrangement because the insulating material does not have proton-conductivity.

In the case of using the respective solid polymer membrane fuel cell having the metal diffusion suppression layer along the boundary surface between the different kinds of metal, as shown in FIGS. 4 and 5, the mutual diffusion of the different kinds of metal (in these cases, palladium (Pd) and the vanadium-nickel alloy (V—Ni)) can be suppressed. Moreover, reduction in the hydrogen permeability of the hydrogen permeable materials can be inhibited.

Figure 6:
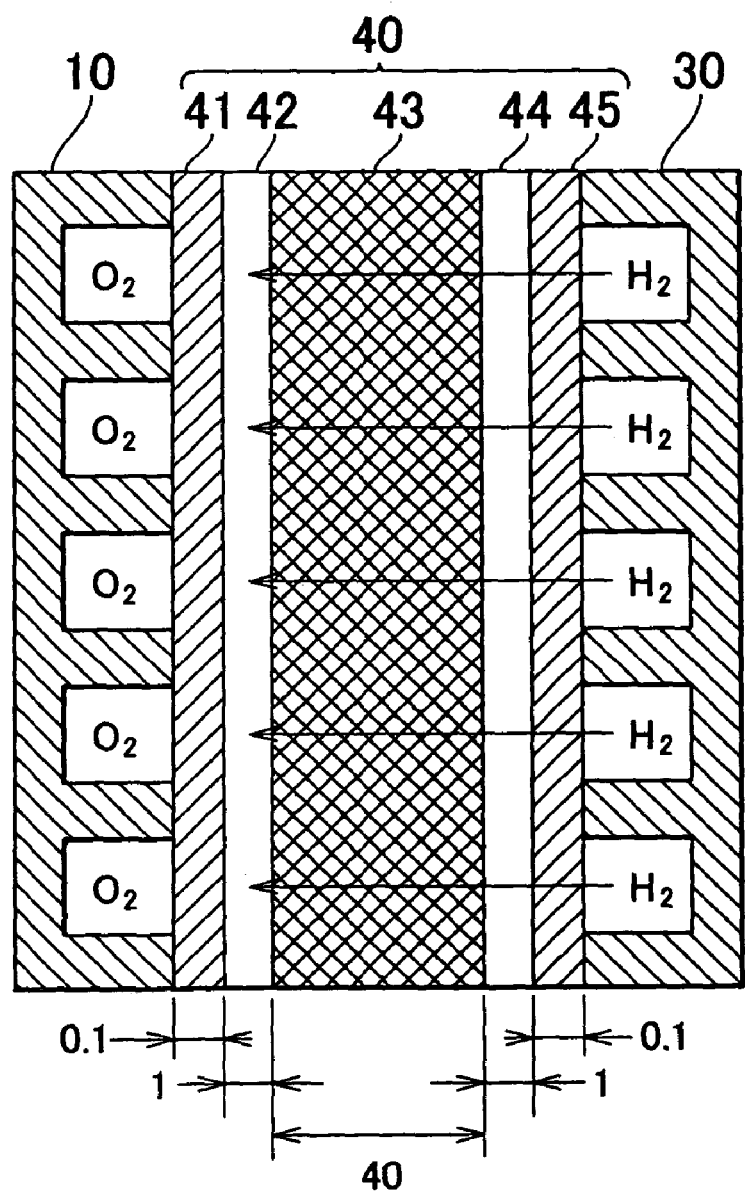
FIG. 6 is an explanatory view schematically illustrating the configuration of a solid oxide fuel cell according to a second embodiment of the invention.

FIG. 6 is an explanatory view schematically illustrating the configuration of a solid oxide fuel cell according to a second embodiment of the invention. This figure shows a cross-section of a constituent cell of this fuel cell. This constituent cell has a structure in which an electrolyte membrane 40 is sandwiched between the oxygen electrode 10 and the hydrogen electrode 30. The structure and material of the oxygen electrode 10 and the hydrogen electrode 30, respectively, are the same as those of the oxygen electrode and the hydrogen electrode of the solid polymer membrane fuel cell described with regard to the first embodiment.

The electrolyte membrane 40 has a five-layer structure in which a dense substrate 43 formed from vanadium (V) is centrally disposed. Thin layers respectively constituted by electrolyte layers 42 and 44 that are made of a solid oxide are formed on both sides of the substrate 43. A barium-cerate-based ($BaCeO_3$-based) ceramic proton conductor or a strontium-cerate-based ($SrCeO_3$-based) ceramic proton conductor may be used as the material for the electrolyte layers 42 and 44. Coatings 41 and 45 of palladium (Pd) are provided on the outer surfaces of the electrolyte layers 42 and 44, respectively. In the second embodiment, the thickness of the coatings 41 and 45 of palladium (Pd) is set to be 0.1 µm. The thickness of the electrolyte layers 42 and 44 is set to be 1 µm. The thickness of the substrate 43 is set to be 40 µm. However, the thickness of each of the layers can be set as chosen. Moreover, instead of palladium (Pd), for example, vanadium (V), niobium (Nb), tantalum (Ta), an alloy containing at least a part of these elements, or a palladium (Pd) alloy may be used for the material of the coatings 41 and 45. The electrolyte layer can be protected by using such coatings.

Further, it is preferable that the substrate 43 is formed from a kind of metallic material that is different to that of the metallic material of the coatings 41 and 45. Generally speaking, alloying happens at the contact surface of different kinds of metal owing to mutual diffusion. However, with this configuration, the electrolyte membrane is interposed between the different kinds of metal, which offers the advantage that the properties of both the metals can be utilized whilst alloying is inhibited from occurring. For instance, a combination of one of vanadium (V), niobium (Nb), tantalum (Ta), and an alloy containing at least a part of these elements, with palladium (Pd) or a palladium (Pd) alloy may be employed for the different kinds of metal.

Further, the substrate 43 may consists of at least two hydrogen separation layers respectively formed from different kinds of metal. Further, a metal diffusion suppression layer for suppressing the diffusion of the different kinds of metal may be provided, at the least, at a portion of the contact interface between the different kinds of metal. In addition, the substrate 43 may be formed from one of vanadium (V), niobium (Nb), tantalum (Ta), and an alloy containing at least a part of these elements. These materials have high hydrogen permeability and are relatively low in price. Consequently, a substrate having sufficient thickness can be formed at low cost.

Normally, a catalyst layer formed from platinum (Pt) and the like is provided within the constituent cell so as to accelerate reactions in an electric power generation process at the hydrogen electrode and the oxygen electrode. Although not shown, catalyst layers can be provided, for instance, between the electrolyte membrane 40 and the oxygen electrode 10, and between the electrolyte membrane 40 and the hydrogen electrode 30. Additionally, catalyst layers can be provided between the coating 41 and the electrolyte layer 42, between the coating 45 and the electrolyte layer 44, and between the substrate 43 and each of the electrolyte layers 42 and 44.

Figure 7:
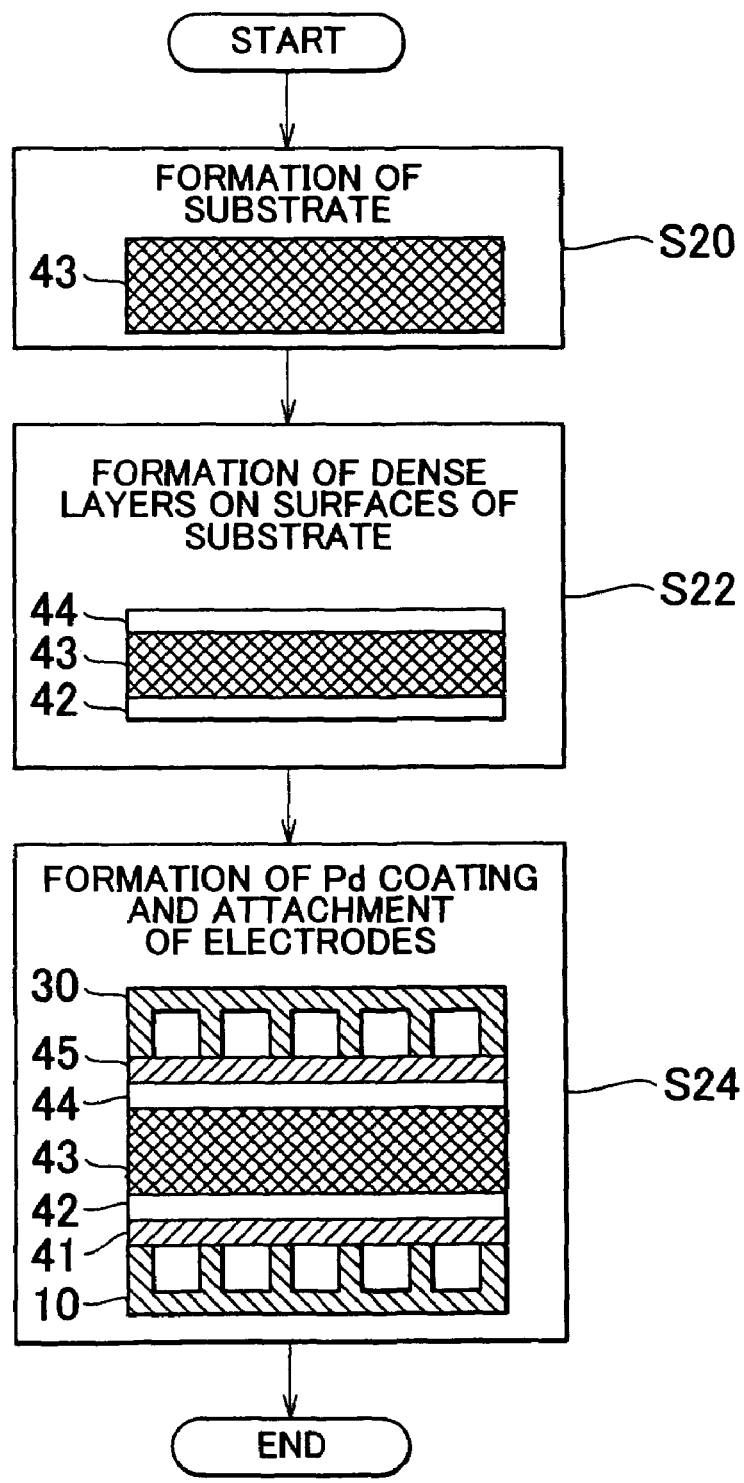
FIG. 7 is a process chart illustrating a process of manufacturing the fuel cell according to this second embodiment of the invention.

FIG. 7 is a process chart illustrating a process of manufacturing the fuel cell according to the second embodiment. In this manufacturing process, first, the substrate 43 is produced in step S20. Then, the electrolyte layers 42 and 44 are respectively formed on both sides of this substrate 43 in step S22. The formation of the electrolyte layers 42 and 44 is executed by producing electrolyte. The method of producing this electrolyte will be described later. The substrate 43 is dense, and thus each of the electrolyte layers 42 and 44 can be formed as a sufficiently thin layer. Various techniques, for example, physical deposition, chemical deposition, and sputtering can be used for forming the layer. Finally, in the last process step, Pd coatings 41 and 45 are formed on the outer surfaces of the electrolyte layers 42 and 44, respectively. Further, the electrodes 10 and 30 are attached to the electrolyte membrane 40 in step S44. With regard to the catalyst layers, they may be suitably formed in accordance with their position during one of the steps.

According to the aforementioned fuel cell, layers are formed on both sides of the dense substrate 43, and thus the electrolyte layers 42 and 44 can be formed to be sufficiently thin. Therefore, resistance of the electrolyte membrane can be suppressed, and the fuel cell can be operated at a relatively low temperature. In the case of this embodiment, the fuel cell can be operated at about 600° C. In the case of reducing the thickness of the electrolyte layers 42 and 44 to about 0.1 µm, the operating temperature of the fuel cell can be lowered to about 400° C.

FIG. 8 is an explanatory view illustrating a layer configuration table of a constituent cell of the solid oxide fuel cell according to the second embodiment of the invention and modifications thereof. Case A corresponds to the structure of the second embodiment illustrated in FIG. 6. That is, this constituent cell has a structure in which the electrolyte layers are provided on both sides of the dense substrate of vanadium (V). Furthermore, the coatings of palladium (Pd) are provided on the outer surfaces of the electrolyte layers, respectively. In this figure, for ease of drawing, the coatings are not distinguished from the substrate, so that the substrate and the coatings are indicated as the "substrate". Moreover, for the convenience of description, the layers are respectively designated by "layer names" L1 to L5 from the oxygen electrode side.

It is sufficient for the fuel cell according to the second embodiment that the electrolyte layers are provided on the dense substrate, respectively. For example, as in Case B, the substrate of vanadium (V) is formed for layer L1, and then the electrolyte membrane can be formed on the hydrogen-electrode-side surface of the substrate of vanadium (V) as layer L2. In layer L1, a coating of palladium (Pd) can be formed on the oxygen-electrode-side surface of the substrate of vanadium (V). A coating of palladium (Pd) is formed on the hydrogen-electrode-side surface of the electrolyte layer L2 as layer L3. Alternatively, as in Case C, layer L3 in Case B can be omitted. In Cases B and C, different kinds of metal, that is, palladium (Pd) and vanadium (V), are in contact with each other in layer L1. Thus, at high temperature, alloying may occur owing to the diffusion of the metals. Therefore, it is preferable that the cells in Cases B and C are operated at about 400° C. However, for operation at such a temperature, it is preferable to reduce the thickness of the electrolyte layer to a sufficiently small value in order to suppress resistance thereof. Preferably, for instance, the thickness of the electrolyte layer is set to be 0.1 µm.

In Case D, it is possible to omit layer L1 of Case B. However, it should be noted that, generally, it is preferable to avoid direct contact between the solid oxide electrolyte layer and the oxygen electrode. Bearing this in mind, it is preferable that layer L1 is not omitted.

Figure 9:
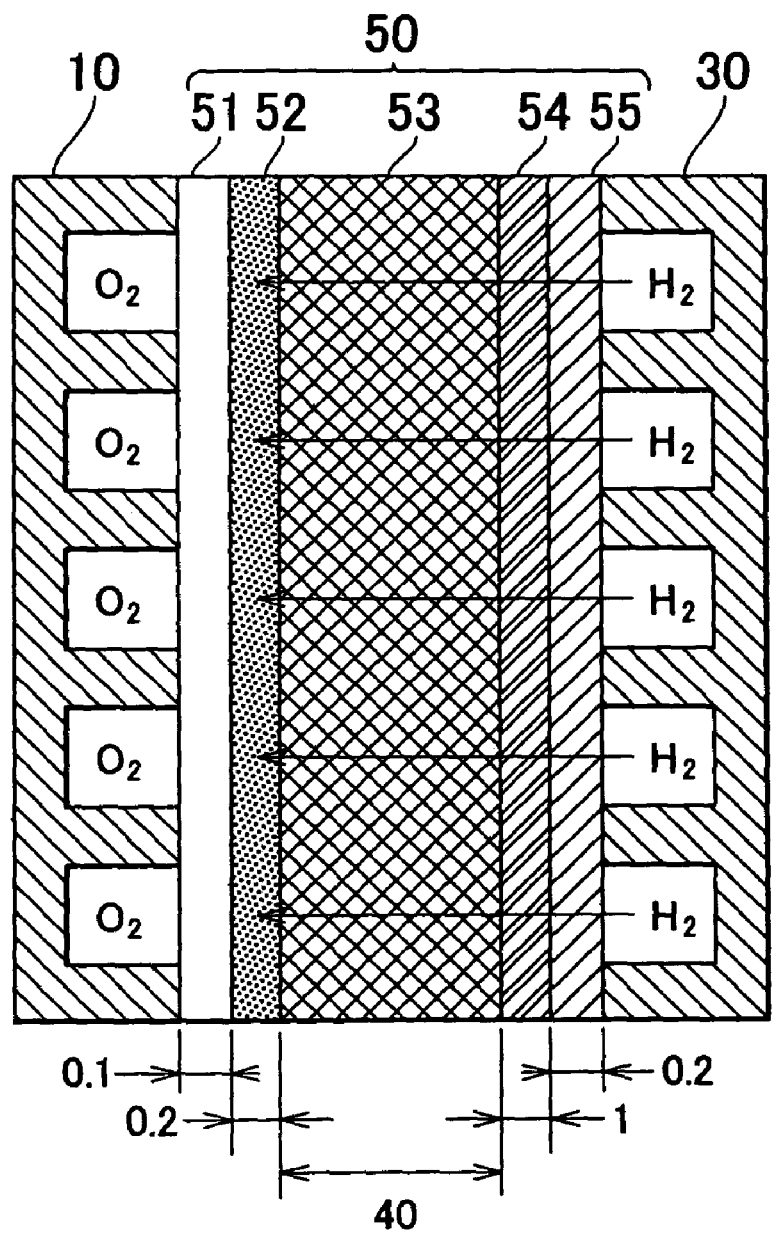
FIG. 9 is an explanatory view schematically illustrating a first configuration of a solid oxide fuel cell having a metal diffusion suppression layer and a reaction suppression layer according to the second embodiment.

FIG. 9 is an explanatory view schematically illustrating a first configuration of a solid oxide fuel cell having a metal diffusion suppression layer and a reaction suppression layer according to the second embodiment. This figure shows a cross-section of a constituent cell of the fuel cell. An electrolyte membrane 50 has a five-layer structure in which a dense substrate 53 formed from vanadium (V) is centrally located. A metal diffusion suppression layer 54, which is a dense element, is provided on the surface of the substrate 53 at the hydrogen-electrode 30 side. Further, a coating 55 of palladium (Pd) is provided on the outer surface of the metal diffusion suppression layer 54.

On the other hand, a reaction suppression layer 52, which is a dense element, is provided on the surface of the substrate 53 at the oxygen electrode 10 side. Further, an electrolyte layer 51, which is a thin membrane, is constituted by a solid oxide, is formed on the outer surface of the reaction suppression layer 52. In the case that the electrolyte layer is made of a solid oxide material, oxygen contained in the electrolyte layer reacts with the substrate when the electrolyte layer is in contact with the substrate. Thus, the substrate becomes an oxide. When such an electrolyte membrane is used in a fuel cell, the hydrogen permeability lowers and the electromotive force of the fuel cell decreases to a level that is lower than a normal level. However, by adopting this configuration in the second embodiment in which the reaction suppression layer is provided, it is possible to inhibit the reaction between the oxygen and the substrate, and suppress reduction in electromotive force. A metal oxide $SrCeO_3$, which is a perovskite oxide, is used as the material of the electrolyte layer 51. In this configuration of the second embodiment, the thickness of the coating 55 of palladium (Pd) is set to be 0.2 µm; the thickness of the metal diffusion suppression layer 54 is set to be 1 µm; the thickness of the reaction suppression layer 52 is set to be 0.2 µm; the thickness of the electrolyte layer 51 is set to be 0.1 µm; and the thickness of the substrate 53 is set to be 40 µm. However, the thickness of each of the layers can be set as chosen. A proton conductor, a mixed conductor, or an insulator is used for the reaction suppression layer 52.

Figure 10:
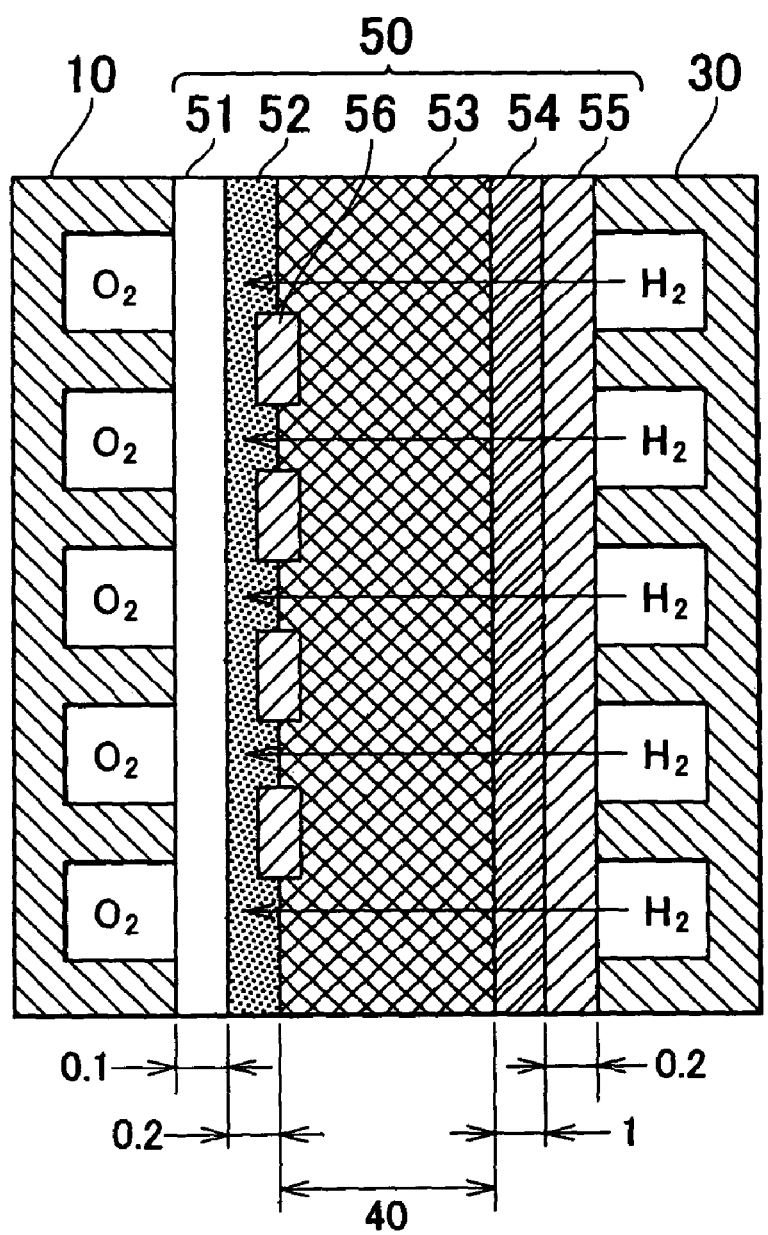
FIG. 10 is an explanatory view schematically illustrating a second configuration of the solid oxide fuel cell having the metal diffusion suppression layer and the reaction suppression layer according to the second embodiment.

FIG. 10 is an explanatory view schematically illustrating a second configuration of the second embodiment of the solid oxide fuel cell having a metal diffusion suppression layer and a reaction suppression layer. This figure illustrates a cross-section of a constituent cell of this fuel cell. The fuel cell shown in this figure differs from the solid oxide fuel cell shown in FIG. 9 in that dense elements 56 of palladium (Pd) are discontinuously formed in an island-like arrangement along the boundary surface between the reaction suppression layer 52 and the substrate 53. The dense elements 56 separate hydrogen molecules into protons and electrons and are thus effective for providing an electromotive force.

Figure 11:
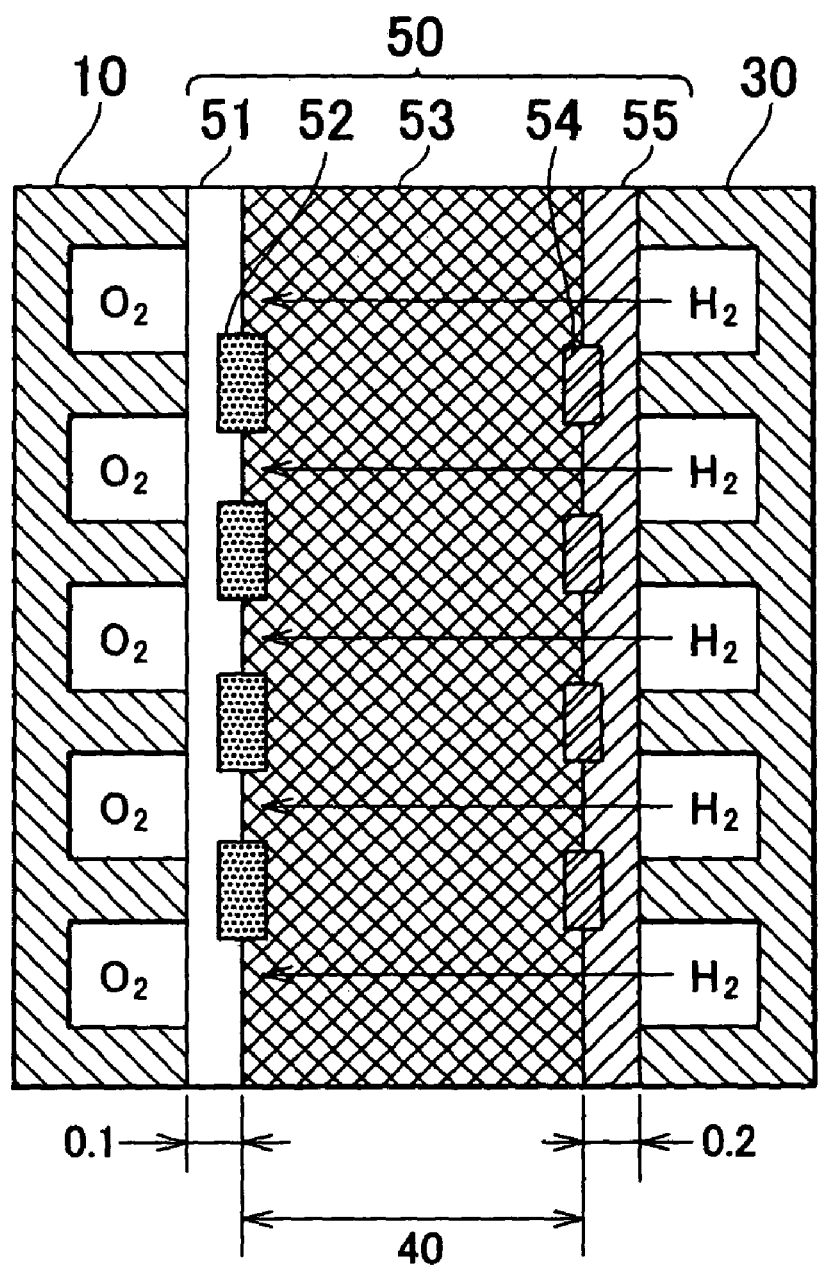
FIG. 11 is an explanatory view schematically illustrating a third configuration of the solid oxide fuel cell having the metal diffusion suppression layer and the reaction suppression layer according to the second embodiment.

FIG. 11 is an explanatory view schematically illustrating a third configuration of the second embodiment of the solid oxide fuel cell having a metal diffusion suppression layer and a reaction suppression layer. This figure illustrates a cross-section of a constituent cell of the fuel cell.

The solid oxide fuel cell shown in this figure differs from that shown in FIG. 9 in that the reaction suppression layer 52 is not continuously but discontinuously formed in an island-like arrangement along the boundary surface between the electrolyte layer 51 and the substrate 53; and also differs in that the metal diffusion suppression layer 54 is not continuously but discontinuously formed in an island-like arrangement along the boundary surface between the substrate 53 and the coating 55. The thickness of the metal diffusion layer 54 is 1 µm, and that of the reaction suppression layer 52 is 0.2 µm. The thickness of each of the layers can be set as chosen. In the case that the metal diffusion suppression layer 54 and the reaction suppression layer 52 are insulators, they do not have proton conductivity. Therefore, it is effective to discontinuously arrange the metal diffusion suppression layer 54 and the reaction suppression layer 52 as illustrated in FIG. 11.

Each of the solid oxide fuel cells illustrated in FIGS. 9 to 11 has the reaction suppression layer 52 provided along the boundary surface between the substrate 53 formed from vanadium (V) and the electrolyte layer 51 formed from a metal oxide. Thus, oxygen moves from the electrolyte layer to the substrate 53, whereupon the oxygen reacts with the vanadium. By providing the suppression layer 52, it is possible to inhibit reduction of the electromotive force of the fuel cell caused by being formed on the boundary surface.

Further, each of these solid oxide fuel cells has the metal diffusion suppression layer 54 along the boundary surface between the substrate 53 formed from vanadium (V) and the coating 55 of palladium. Thus, mutual diffusion of metals can be suppressed, and, furthermore, reduction in the hydrogen permeability of the hydrogen permeable materials can be inhibited.

Hereinafter, the method of producing the electrolyte in step S22 of FIG. 7 is described. In the second embodiment of this invention, the electrolyte is a perovskite-type composite oxide. Perovskite-type composite oxides are oxides generally represented by the formula $ABO_3$. It should be noted that it is assumed herein that the A-site element in this formula is an alkali metal element.

FIG. 12 is an explanatory view illustrating a first way of generating electrolytes according to the second embodiment of the invention. The upper part of this figure represents a state of a molecule when the electrolyte is not yet produced, while the lower part of the figure represents a state of the molecule when the electrolyte has already been produced. Before the reaction occurs, the molar concentration of AO is less than that of $BO_2$. However, after the reaction there between, $ABO_3$ is produced, and $BO_2$ remains. It is preferable, for example, that the ratio between the molar concentrations of AO and $BO_2$ is in accordance with the following expression:

$$[AO]/[BO_2]=0.95\sim0.99$$

where, [ ] indicates molar concentration.

FIG. 13 is an explanatory view illustrating a second way of generating electrolytes according to the second embodiment of the invention. The upper part of this figure represents a state of a molecule when the electrolyte is not yet produced, while the lower part of the figure represents a state of the molecule when the electrolyte has already been produced. Before the reaction occurs, an oxide $MO_2$, that reacts with the alkali metal A-site element to form an oxide is included in the molecule, in addition to AO and $BO_2$. When the reaction there between occurs, $ABO_3$ and $AMO_3$ are produced, and $BO_2$ remains. It should be noted that the molar concentration of AO is less than the sum of the molar concentrations of $BO_2$ and $MO_2$. It is preferable that, for example, the molar concentrations of AO, $BO_2$ and $MO_2$ satisfy the following expression:

$$[AO]/([BO_2]+[MO_2])=0.95\sim0.99$$

where, [ ] indicates molar concentration.

Note that, the oxide $MO_2$, which reacts with the alkali metal to form an oxide, is, for example, $TiO_2$, $MnO_2$, or $Fe_2O_3$. The oxide $MO_2$ reacts with the alkali metal A to form an oxide, for instance, $ATiO_3$, $AMnO_3$, or $AFeO_3$.

For example, a rare-earth element may be employed as the B-site element. The rare-earth element is, for instance, cerium (Ce), zirconium (Zr), yttrium (Y), and ytterbium (Yb).

It should be noted that alkali metal oxide (AO) reacts with carbon dioxide ($CO_2$) contained in cathode and anode gases, to produce a carbonate. This carbonate can cause reduction in electric conductivity and breakdown of the electrolyte layer. Therefore, it is preferable that alkali metal oxide (AO) does not exist independently after the electrolyte is produced. According to the methods of generating the electrolyte illustrated in FIGS. 12 and 13, AO, that is, the alkali metal oxide, does not exists independently after the electrolyte is generated.

The method of producing the electrolyte according to the second embodiment of the invention can be applied not only to the electrolyte, which is the perovskite type composite oxide, but to electrolytes that are pyrochlore oxides ($A_2B_2O_7$) and spinel oxides ($ABO_4$). Moreover, the electrolyte may contain impurities. Therefore, the method of producing the electrolyte according to the second embodiment of the invention can be applied to electrolytes such as $(A_{0.8}a_{0.2})BO_3$ and $ABCO_x$.

While the invention has been described with reference to various exemplary embodiments thereof, it should be understood that the invention is not limited thereto. To the contrary, the invention is intended to cover various modifications and equivalent arrangements. In addition, needless to say, while the various elements of the exemplary embodiments are shown in various combinations and configurations, which are exemplary, other combinations and configurations, including more elements or only a single element, are also within the spirit and scope of the invention.

What is claimed is:

1. A fuel cell, comprising:
   an electrolyte membrane having a substrate formed from a dense hydrogen permeable material and an inorganic electrolyte layer formed on at least one side of the substrate;
   an oxygen electrode disposed on one side of the electrolyte membrane;
   an oxidizing gas supply portion that supplies an oxidizing gas to the oxygen electrode;
   a hydrogen electrode disposed on the other side of the electrolyte membrane; and
   a fuel gas supply portion that supplies a hydrogen-rich fuel gas to the hydrogen electrode; wherein the substrate permeates the hydrogen in the state of protons or hydrogen atoms and the electrolyte layer has proton conductivity;
   wherein the substrate made of the hydrogen permeable material includes at least two hydrogen separation membrane layers respectively made of different kinds of metal, and a metal diffusion suppression layer, provided on at least a part of a contact interface between the separation membrane layers of the different kinds of metal, for suppressing diffusion of the different kinds of metal.

2. The fuel cell according to claim 1, wherein a surface of a side of the electrolyte layer that is not in contact with the substrate is coated with a coating made of a hydrogen permeable material; and the substrate and the coating are formed from different kinds of metallic materials, respectively.

3. The fuel cell according to claim 1, wherein the metal diffusion suppression layer contains at least one of a proton conductor, a mixed conductor, an insulating material, a ceramic, and a proton-nonconductive metal.

4. The fuel cell according to claim 1, wherein the electrolyte layer has a thickness of 0.1 to 1 µm.

5. A fuel cell, comprising:
   an electrolyte membrane having a substrate formed from a dense hydrogen permeable material and an inorganic electrolyte layer formed on at least one side of the substrate;
   an oxygen electrode disposed on one side of the electrolyte membrane;
   an oxidizing gas supply portion that supplies an oxidizing gas to the oxygen electrode;
   a hydrogen electrode disposed on the other side of the electrolyte membrane; and
   a fuel gas supply portion that supplies a hydrogen-rich fuel gas to the hydrogen electrode; wherein the substrate permeates the hydrogen in the state of protons or hydrogen atoms and the electrolyte layer has proton conductivity;
   wherein the electrolyte layer is formed from a solid oxide, and the electrolyte membrane has a reaction suppression layer, provided on at least a part of an interface between the substrate and the electrolyte layer, for suppressing a reaction between an oxygen atom, which is contained in the electrolyte layer, and the substrate.

6. The fuel cell according to claim 5, wherein the reaction suppression layer contains at least one of a proton conductor, a mixed conductor, and an insulating material.

7. The fuel cell according to claim 5, wherein a surface of a side of the electrolyte layer that is not in contact with the substrate is coated with a coating made of a hydrogen permeable material; and the substrate and the coating are formed from different kinds of metallic materials, respectively.

8. The fuel cell according to claim 5, wherein the electrolyte layer has a thickness of 0.1 to 1 µm.

9. A fuel cell, comprising:
   an electrolyte membrane having a substrate formed from a dense hydrogen permeable material and an inorganic electrolyte layer formed on at least one side of the substrate;
   an oxygen electrode disposed on one side of the electrolyte membrane;
   an oxidizing gas supply portion that supplies an oxidizing gas to the oxygen electrode;
   a hydrogen electrode disposed on the other side of the electrolyte membrane; and
   a fuel gas supply portion that supplies a hydrogen-rich fuel gas to the hydrogen electrode; wherein the substrate permeates the hydrogen in the state of protons or hydrogen atoms and the electrolyte layer has proton conductivity;

wherein an electrolyte of the electrolyte layer is a composite oxide containing an A-site material having an alkali metal element as a principal component, and a B-site material having another element as a principal component, such that a molar ratio of the A-site material to the B-site material is constant, and also containing a predetermined amount of oxygen; the composite oxide is synthesized by a reaction between the A-site material and the B-site material, and during the reaction, the molar ratio of the A-site material to the B-site material is smaller than the constant molar ratio.

10. The fuel cell according to claim 9, wherein a surface of a side of the electrolyte layer that is not in contact with the substrate is coated with a coating made of a hydrogen permeable material; and the substrate and the coating are formed from different kinds of metallic materials, respectively.

11. The fuel cell according to claim 9, wherein the electrolyte layer has a thickness of 0.1 to 1 µm.

12. A fuel cell, comprising:
an electrolyte membrane having a substrate formed from a dense hydrogen permeable material and an inorganic electrolyte layer formed on at least one side of the substrate;
an oxygen electrode disposed on one side of the electrolyte membrane;
an oxidizing gas supply portion that supplies an oxidizing gas to the oxygen electrode;
a hydrogen electrode disposed on the other side of the electrolyte membrane; and
a fuel gas supply portion that supplies a hydrogen-rich fuel gas to the hydrogen electrode; wherein the substrate permeates the hydrogen in the state of protons or hydrogen atoms and the electrolyte layer has proton conductivity;
wherein an electrolyte of the electrolyte layer is a composite oxide containing an A-site material having an alkali metal element as a principal component, and a B-site material having another element as a principal component, such that a molar ratio of the A-site material to the B-site material is constant, and also containing a predetermined amount of oxygen; and the composite oxide is synthesized in a state in which the composite oxide contains a predetermined amount of an oxide of a third material that forms an oxide together with the alkali metal element.

13. The fuel cell according to claim 12, wherein a surface of a side of the electrolyte layer that is not in contact with the substrate is coated with a coating made of a hydrogen permeable material; and the substrate and the coating are formed from different kinds of metallic materials, respectively.

14. The fuel cell according to claim 12, wherein the electrolyte layer has a thickness of 0.1 to 1 µm.

* * * * *